June 12, 1951 G. K. TEAL 2,556,991

LIGHT SENSITIVE ELECTRIC DEVICE

Filed March 20, 1946 3 Sheets-Sheet 1

INVENTOR
G. K. TEAL
BY
Stanley B. Kent
ATTORNEY

INVENTOR
G. K. TEAL
BY
Stanley B. Kemb
ATTORNEY

INVENTOR
G. K. TEAL
BY Stanley B. Kent
ATTORNEY

Patented June 12, 1951 2,556,991

UNITED STATES PATENT OFFICE 2,556,991

LIGHT-SENSITIVE ELECTRIC DEVICE

Gordon K. Teal, Summit, N. J., assignor to Bell Telephone Laboratories, Incorporated, New York, N. Y., a corporation of New York Application March 20, 1946, Serial No. 655,695

10 Claims. (Cl. 201—63)

This invention relates to light sensitive electric devices and more particularly to photoconductive devices and method of making such devices.

An object of this invention is to provide an improved photoconductive device.

This invention is based upon the discovery that a thin film of purified silicon deposited on a ceramic support exhibits a photoconductive effect when irradiated with visible or near infrared light. Silicon films including small amounts of titanium as an impurity element also exhibit a photoconductive effect. Such films also exhibit a large decrease in resistance when their temperature is increased and such decrease in resistance occurs not only at high temperatures but at relatively low temperatures.

Other materials which may be used to produce photoconductive films are germanium and boron. The elements boron, germanium and silicon are much alike in respect to their response to light and, therefore, may be considered as a group in connection with the manufacture of photoconductive devices.

In an example of practice of this invention, a small ceramic tube, such as a porcelain tube, is provided with a film of very pure silicon, preferably by the pyrolytic deposition of silicon from a gaseous mixture of silicon tetrachloride and hydrogen as the mixture passes over the surface of a heated ceramic tube in a reaction chamber the walls of which are water cooled. A good deposit is obtained with the temperature of the ceramic tube between 1000° C. (centigrade) and 1250° C. A typical photoconductive film of silicon 5 microns thick may be formed in about one and one-half minutes at a ceramic tube temperature of 1100° C. The ceramic tube is heated by passing electric current through a tantalum wire located within the bore of the tube.

In another example of practice, a small amount of titanium is deposited simultaneously with the silicon by mixing gaseous titanium tetrachloride with the above-mentioned mixture of silicon tetrachloride and hydrogen.

The ceramic tube may be a sillimanite tube. Quartz tubes may also be used for the film support. Flat plates of porcelain, sillimanite or quartz may also be used as supports for the films instead of tubes.

The preferred photoconductive devices of silicon are composed of films having relatively low specific conductivities in the temperature range below about 227° C.

Films of boron and germanium may also be formed on ceramic tubes or plates by pyrolytic deposition of these elements from their gaseous chloride compounds.

Electrical contacts for the above-described films may be formed advantageously by applying a band of colloidal silver paste over the films at the ends of small sections of the tubes and firing to a bright yellow heat with an oxygen torch. Electrical conductors may be attached to these bands in any well-known manner, as by clamping or soldering.

The invention now will be described more in detail, having reference to the accompanying drawing.

The same reference characters are used to designate identical elements in the several figures of the drawing.

Figure 1:
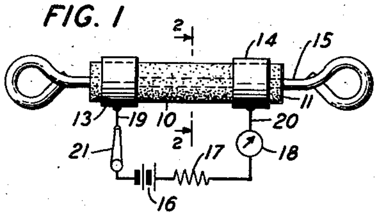
Fig. 1 is a side view of a photoconductive device, according to this invention.
Figure 2:
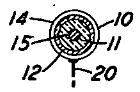
Fig. 2 is a cross-section of the device of Fig. 1 looking in the direction of the arrows 2.

Referring now to Figs. 1 and 2 of the drawing, a photoconductive device 10, according to this invention, comprises a tube 11 of porcelain or sillimanite on which a thin film 12 of highly purified silicon is deposited by pyrolytic chemical reaction of silicon tetrachloride ($SiCl_4$) and hydrogen. Near each end of the film-coated tube 11 and over the film 12 are contacts 13 and 14 of fired silver paste. A tantalum heater wire 15 is located within and substantially fills the bore of tube 11. This wire is formed with loops at each end for a purpose to be described hereinafter. The wire 15 may be removed after the film has been deposited and either before or after the contacts 13 and 14 have been applied. It is to be understood that the dimensions of the several elements illustrated in Figs. 1 and 2 are greatly exaggerated for purposes of illustration. The film 12 and the contacts 13 and 14 are very much thinner with respect to the diameter of the tube 11 than as illustrated.

For use as a photoconductive device a source of electrical potential, such as a battery 16, a load circuit, such as resistor 17, and a current indicator, such as microammeter 18, may be connected in series and by a switch 21 and conductors 19 and 20 to the contacts 13 and 14. Conductors 19 and 20 may be soldered or otherwise held in contact with the contacts 13 and 14, respectively.

Figure 3:
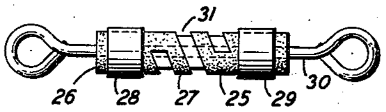
Fig. 3 is a modified form of the invention particularly adapted for use as a variable resistor having a high negative temperature coefficient of resistance.

The device 25, illustrated in Fig. 3, is similar to the device of Figs. 1 and 2 except that it is especially formed to function as a variable resistor having a high negative temperature coefficient of resistance. Such a device may be called a thermistor. Device 25 comprises a ceramic tube 26, a thin film 27 of silicon deposited on the tube 26, terminal contacts 28 and 29 of fired silver paste, and a tantalum heater wire 30. The film 27 has a helical slit 31 cut through its surface for the purpose of increasing the resistance between the contacts 28 and 29. As illustrated, the slit 31 consists of only two turns but any number of turns may be used, depending upon the result desired. Electrical conductors may be connected to contacts 28 and 29, as described in connection with conductors 19 and 20 in Fig. 1.

Photoconductive devices according to this invention have highly desirable characteristics, as will now be explained.

Figure 4:
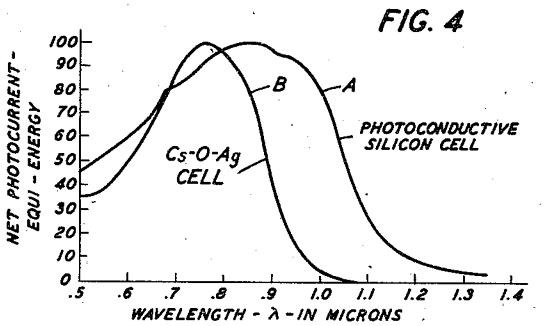
Fig. 4 shows graphs of the spectral sensitivity of photoconductive silicon devices, according to this invention, and cesium-oxygen-silver (Cs-O-Ag) phototubes.

In Fig. 4 graph A shows the spectral sensitivity of a photoconductive silicon cell, and graph B shows the spectral sensitivity of a Cs-O-Ag phototube. The absolute magnitude of response of each of these devices is not indicated by graphs A and B since the maximum response of each device is shown equal to 100 on an arbitrary photocurrent scale; however, for each device the responses to light of different wavelengths are on an equal energy basis. The maximum response for the silicon cell lies between 8400 and 8600 A. U. (Angstrom units). The long wavelength limit has not been determined accurately but lies in the neighborhood of 12,000 to 15,000 A. U. The maximum response of the Cs-O-Ag phototube as shown by graph B is at a considerably shorter wavelength as is also the case with the long wavelength limit of response. The photoconductive silicon cell shows a more nearly equal response over a much greater range of wavelengths than the Cs-O-Ag phototube.

Figure 5:
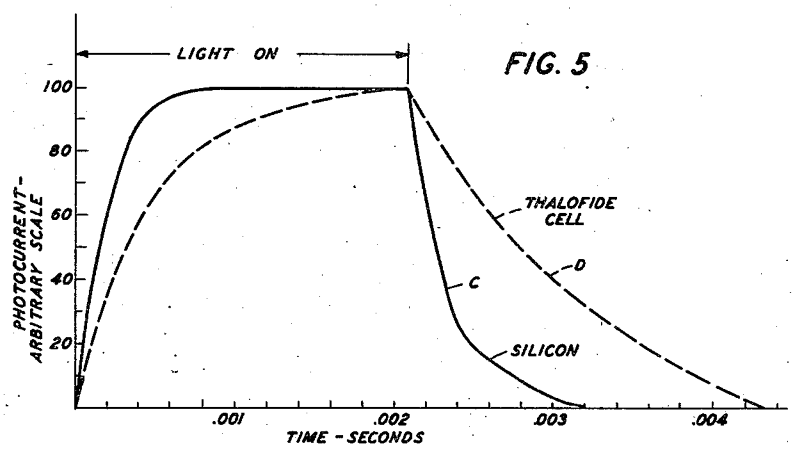
Fig. 5 shows graphs of the dynamic response of photoconductive silicon devices according to this invention and of a Thalofide cell.

In Fig. 5 graphs C and D illustrate the relative speeds of response respectively of a photoconductive silicon cell and a typical Thalofide cell. These graphs represent the patterns obtained on a cathode ray oscillograph while the device is illuminated with an intermittent light signal of about 240 cycles per second. The scales for the different devices are arbitrary. The speed of response of the photoconductive silicon cell is considerably faster than that of the Thalofide cell. The photoconductive silicon cell reaches substantially maximum response in about 0.001 second. This is an important characteristic taken in connection with the fact that such silicon cells may be heated to a red heat in an oxygen gas flame without decrease in sensitivity when cooled to room temperature.

Figure 6:
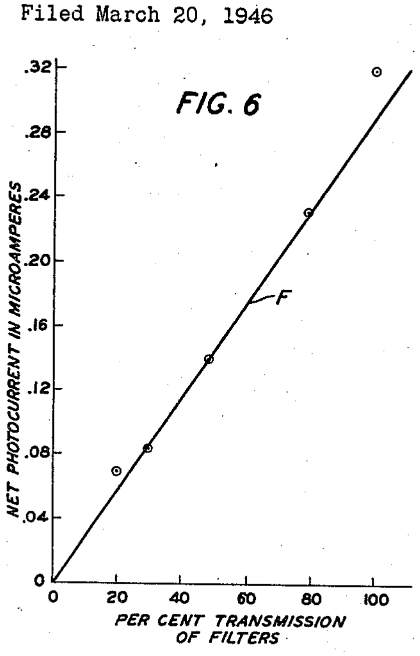
Fig. 6 shows a graph of the variation of photo response with change of illumination of a silicon device according to this invention.

From graph F of Fig. 6 it is seen that the response of a photoconductive silicon cell is approximately proportional to the illumination. This graph shows the response for light of wavelength approximately 9200 A. U. Levy line screens were used as filters to effect the change in illumination, their transmission being measured under the conditions of use.

Figure 7:
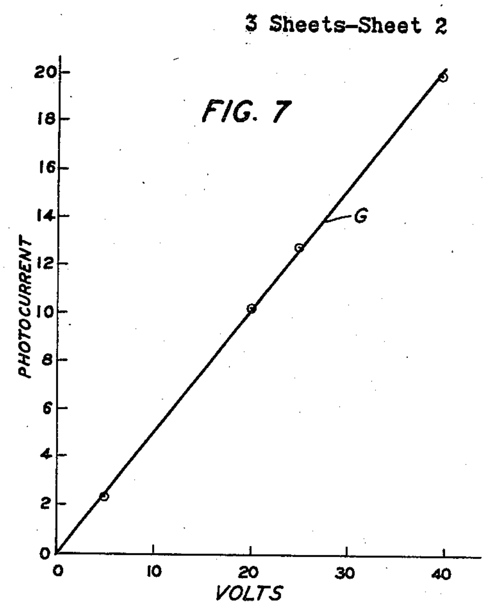
Fig. 7 shows a graph of the variation of photo response with change of voltage of a silicon device according to this invention.

In Fig. 7 graph G shows the variation in the response of a typical photoconductive silicon cell for variation in voltage impressed upon the terminals of the device. The relative responses were determined by using intermittent illumination and a cathode ray oscillograph. Up to 40 volts the responses are linear as shown by graph G.

Apparatus for depositing films of silicon, or silicon mixed with titanium, on the surfaces of ceramic tubes will now be described with reference to Fig. 8. The ceramic tube 11 provided with tantalum wire 15, as described hereinbefore in connection with Figs. 1 and 3, is suspended in the reaction chamber 40. In order to introduce the ceramic tube into the reaction chamber 40 the head 41 is unscrewed and removed therefrom, the water circulating hoses 42 and 43 being first detached. Molded or otherwise fixed in the head 41 are terminal and cooling fixtures for suspending the ceramic tube 11 and tantalum wire 15. These fixtures comprise a large U-shaped tube 44 and a smaller U-shaped tube 45. These tubes are preferably of copper and they serve to conduct cooling liquid through the heat-distributing terminals 46 and 47 between which tantalum wire 15 is suspended by retractile springs 48 and 49. After the tantalum wire 15, carrying the ceramic tube 11, has been suspended between the terminals 46 and 47 the head 41 is screwed back into place closing the open end of the chamber 40. The circulating hoses 42 and 43, the purpose of which will be explained hereinafter, are again connected as shown in Fig. 8.

Figure 8:
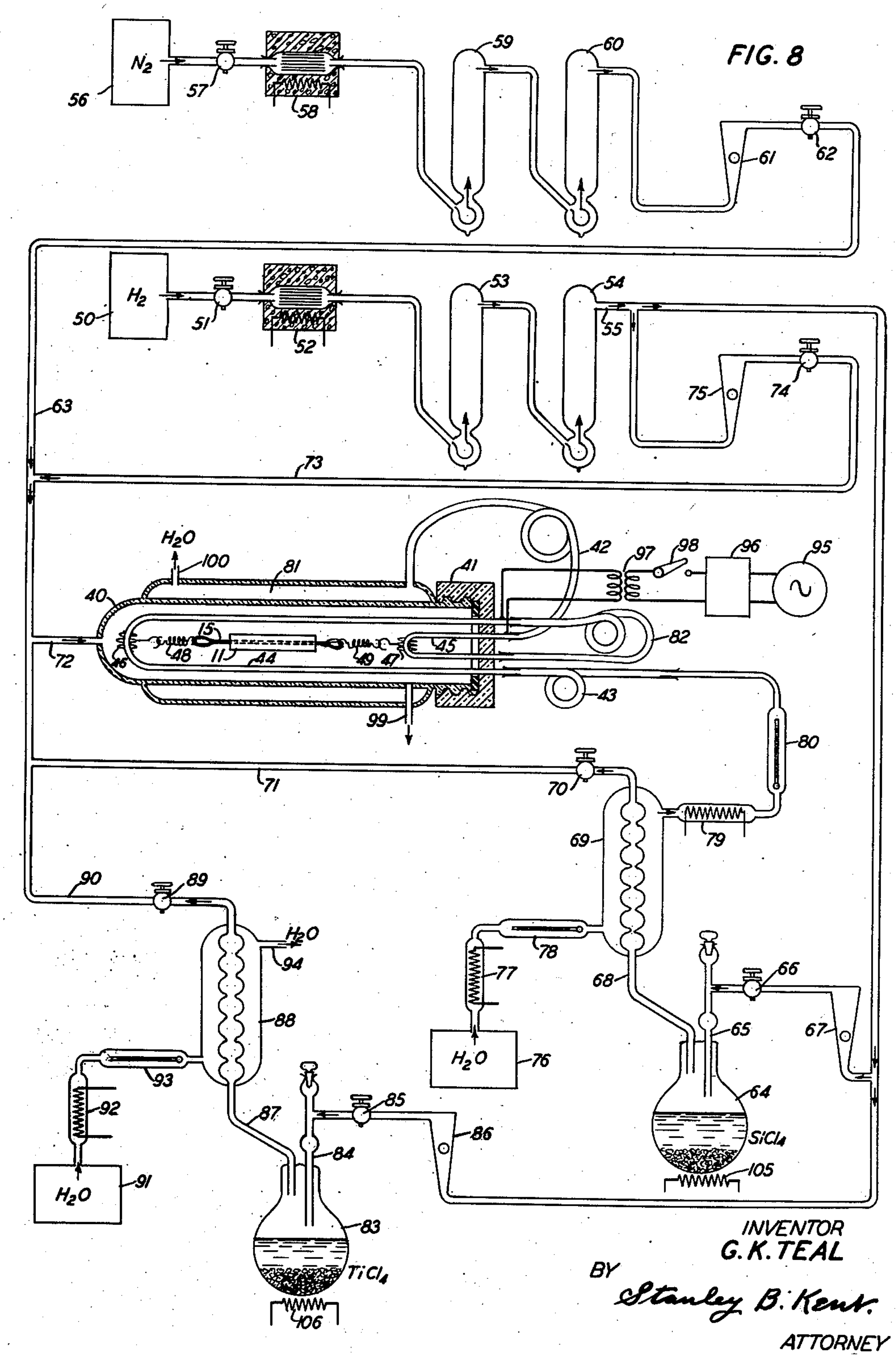
Fig. 8 illustrates an apparatus suitable for the pyrolytic deposition of photoconductive films on ceramic tubes, according to this invention.

The apparatus for administering the desired gaseous mixture, such as a mixture of hydrogen and silicon tetrachloride, to the reaction chamber 40 is also shown in Fig. 8. The hydrogen is obtained from a supply tank 50 under control of valve 51 from which the hydrogen gas enters the deoxidizing furnace 52 for the purpose of removing any trace of free oxygen that may be mixed with the hydrogen. From the furnace 52 the hydrogen and any water vapor that may be formed in the furnace enters the drying towers 53 and 54. These drying towers may be provided with phosphorus pentoxide for removing all traces of water vapor, thus permitting only pure hydrogen to flow into the outlet pipe 55.

A supply of dry nitrogen for flushing the system may be obtained from a nitrogen supply tank 56 under control of valve 57 from which the nitrogen gas enters a deoxidizing furnace 58 for removing traces of free oxygen that may be mixed with the nitrogen. From the furnace 58 the nitrogen and any water vapor that may be formed in the furnace 58 enters the drying towers 59 and 60. These towers may be of the same construction as towers 53 and 54 permitting only pure nitrogen to flow through flowmeter 61 when valve 62 is opened to permit nitrogen to flow into the system through tube 63.

Silicon tetrachloride in gaseous form is derived from boiler 64 where it is first mixed with hydrogen gas under conditions that give the mixture a high degree of saturation. The mixture is effected by introducing pure hydrogen gas through the inlet tube 65 into the vapor of silicon tetrachloride in the upper portion of boiler 64 under control of the valve 66 after the hydrogen passes through the flowmeter 67 from the outlet tube 55. The vapor is produced by gently boiling liquid silicon tetrachloride in boiler 64 by heat generated in electric heater 105. The hydrogen gas after mixing with the silicon tetrachloride vapor in the boiler 64, passes through the boiler outlet pipe 68 into the reflux condenser 69 which is packed with glass helices. From the condenser 69 the gaseous mixture of hydrogen and silicon tetrachloride vapor passes through valve 70 and tube 71 to the intake tube 72 of the reaction chamber 40. A by-pass tube 73 with valve 74 is also provided for diluting the gaseous mixture, if desired, by passing some of the hydrogen directly into the reaction chamber 40.

The water for the cooling system is obtained from a source 76 of cool water and raised to a predetermined temperature, preferably a few degrees above freezing, by means of a heater 77. The cooling water passes through a thermometer chamber 78 which gives a continuous indication of the temperature of the water and enters the reflux condenser 69 to fix the concentration of the gaseous mixture from the boiler 64. From the condenser 69 the cooling water passes through a second heater 79 and thermometer chamber 80 into the cooling jacket 81 surrounding the walls of the reaction chamber 40 by way of hose 43, U-shaped tube 44, hose 82, U-shaped tube 45 and hose 42. The cooling water passes from the cooling jacket 81 through waste tube 100.

In order to provide for the simultaneous deposition of titanium, if desired, an arrangement for adding a mixture of hydrogen and titanium tetrachloride is provided. Titanium tetrachloride in a gaseous form is derived from boiler 83 where it is mixed with hydrogen gas under conditions which give the mixture a high degree of saturation. This mixture is effected by introducing pure hydrogen gas through inlet tube 84 into the vapor of titanium tetrachloride in the upper portion of boiler 83 under control of valve 85 after the hydrogen passes through flowmeter 86 from the outlet tube 55. The vapor is produced by gently boiling liquid titanium tetrachloride in boiler 83 by heat generated in electric heater 106. The hydrogen gas, after mixing with the titanium tetrachloride vapor, passes through the boiler outlet tube 87 into the reflux condenser 88. From the condenser 88 the gaseous mixture of hydrogen and titanium tetrachloride vapor passes through valve 89 and tube 90 to the reaction chamber 40 through intake tube 72.

Cooling water for reflux condenser 88 is obtained from source 91 of cool water heated in heater 92, passed through a thermometer chamber 93 into the reflux condenser 88 and out through waste tube 94.

The necessary heat for producing the chemical reaction of the gaseous mixture within the reaction chamber 40 is derived from a source of electrical current 95. A suitable regulator 96 serves to maintain the voltage at a value suitable to produce the required temperature within the chamber 40. The energy from source 95 is supplied to the suspended tantalum heater wire 15 within the chamber 40 by connecting the secondary winding of transformer 97 to the circulating tubes 44 and 45, thus causing a current to flow through the wire 15 by way of the terminals 46 and 47 and the suspension springs 48 and 49 when primary switch 98 is closed.

The flowmeters 61, 67, 75 and 86 comprise tapered glass tubes in which glass balls or hard rubber floats float as the gases flow through from the bottom upward. The position of the floating element gives an indication of the rate of flow.

If boron or germanium is to be deposited, the boiler 64 may be used to provide a mixture of hydrogen with vapors of a compound of the desired one of these elements. Nitrogen from source 56 may be used to flush the system whenever desired.

When it is desired to deposit a film of pure silicon on the ceramic tube 11 silicon tetrachloride is used, preferably in boiler 64. Boiler 83 is not used and valves 85 and 89 are closed. Dry tank hydrogen is passed over the ceramic tube 11 for several minutes by opening valves 51 and 74 while all of the other valves in the system are kept closed. Hydrogen from the tank 50 passes through the valve 51, furnace 52, drying towers 53 and 54, outlet tube 55, flowmeter 75, valve 74, by-pass tube 73, inlet tube 72 to the reaction chamber 40 and out through the waste tube 99. While the hydrogen is flowing through the reaction chamber 40 the switch 98 is closed and tantalum wire 15 is raised to a temperature sufficient to heat the ceramic tube 11 to 1200° C. at which temperature it is maintained for about 30 seconds. The temperature of the tube 11 is determined by any well-known means, such as an optical pyrometer. The tube 11 is now ready to be coated with pure silicon, the thickness and character of the film being determined by the hydrogen flow, the silicon tetrachloride flow, the time of deposition, the temperature of the ceramic tube and the type of ceramic used for the tube. By suitably controlling these variables a coherent, smooth, grey to black film may be obtained on ceramics.

Preparatory to effecting the deposition the valve 70 is opened and the openings of valves 74 and 66 are adjusted to give the desired ratio between the amount of hydrogen flowing through the by-pass tube 73 and the amount flowing through tube 65 into the silicon tetrachloride boiler 64. This ratio may be of the order of 1:1, as determined by the observation of flowmeters 75 and 67. The heater 77 is adjusted to a temperature of about 3° C. and may be thermostatically controlled. The heater 79 is adjusted to maintain the water entering the cooling system of the reaction chamber 40 at approximately room teperautre, say 25° C.

After several minutes of flow to establish the equilibrium of the gaseous mixture of hydrogen and silicon tetrachloride the temperature of the ceramic tube 11 is raised to approximately 1100° C. or any other desired temperature between about 1000° C. and 1250° C. and maintained for the period of the deposition which may be one and one-half minutes for a temperature of 1100° C. During this period chemical reaction occurs between the gaseous silicon tetrachloride and the hydrogen, the liberated pure silicon is deposited on the surface of the ceramic tube 11 and the unwanted products of the reaction are discharged through the waste tube 99.

If it is assumed that the hydrogen gas emerging from the boiler 64 is highly saturated, possibly supersaturated, with silicon tetrachloride, the condensation occurring within the condenser 69 will reduce the concentration of the silicon tetrachloride to the saturation value corresponding to the temperature within the condenser. Therefore, when the mixture enters the reaction chamber 40 it encounters a chamber wall temperature which is somewhat higher than that of the condenser. This differential increases the saturation pressure of the gaseous mixture to a point which is safely above the partial pressure of the silicon tetrachloride and thereby prevents condensation of the silicon tetrachloride on the walls of the reaction chamber. The same differential temperature relation is maintained between the condenser and the terminal fixtures within the reaction chamber 40 by means of the cooling tubes 44 and 45 and the external tubes 42, 43 and 82 through which the cooling water circulates.

The coated ceramic tube 11 may be removed from the reaction chamber 40 and provided with terminal contacts, as described hereinbefore.

If the deposited film is to contain titanium, hydrogen saturated with titanium tetrachloride is mixed with the hydrogen and silicon tetrachloride mixture described above by simultaneously opening valves 85 and 89 to obtain a desired flow of hydrogen saturated with titanium tetrachloride through outlet pipe 90. The heater 92 maintains the cooling water in reflux condenser 88 at approximately 2° C.

Boron and germanium may be deposited instead of silicon by replacing the silicon compounds in boiler 64 with a desired compound of boron or germanium.

Figure 9:
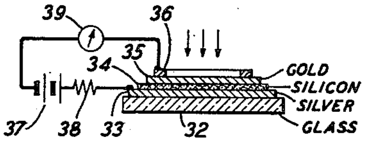
Fig. 9 is a modified form of photoconducting device according to this invention.

The modified photoconductive device of Fig. 9 comprises a glass plate 32 on one face of which a layer 33 of silver is vaporized. A relatively thick layer 34 of highly purified silicon is vaporized on the layer of silver. On the surface of the silicon layer is a light transmitting layer 35 of gold formed by vaporization. Around the outside surface area of the layer 35 is deposited a ring 36 of metal, such as gold or copper, which layer is relatively thick and to which conductors may be attached. An electrical circuit including a source of current, such as battery 37, a load device, such as resistor 38, and a current indicating device, such as milliammeter 39, may be connected in series between the silver layer 33 and the metal ring 36 which serve as terminals for the photoconductive device. An increase in specific conductivity occurs when the layer 34 of silicon is illuminated by light passing through the layer 35 of gold, as indicated by the arrows in Fig. 9.

Figure 10:
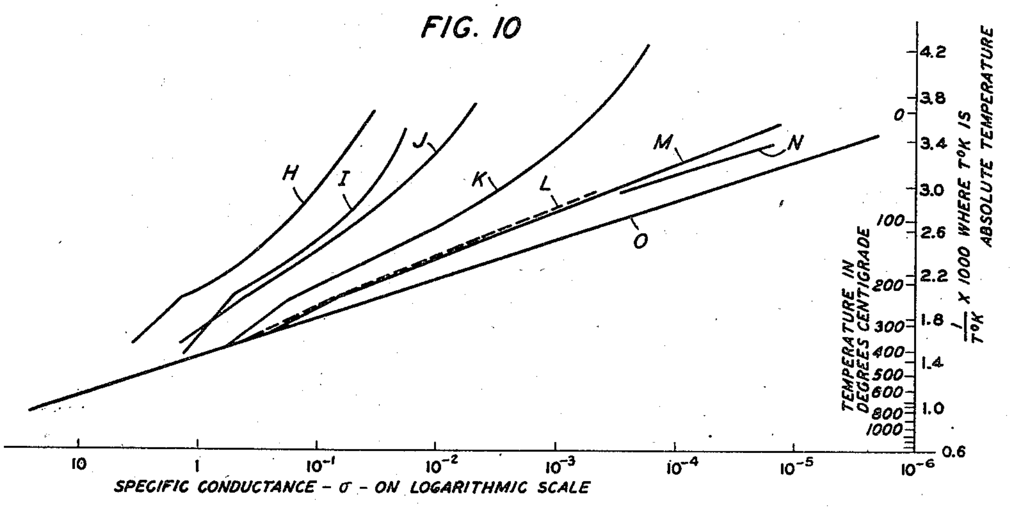
Fig. 10 shows graphs of the variation of the conductivity of silicon films with change of temperature.

Fig. 10 shows plots of the logarithm of the specific conductivity of silicon films versus the reciprocal of the absolute temperature. The graphs, H, I, J, K, L, M and N show data obtained on various silicon films deposited on porcelain in the manner hereinbefore described. These graphs show three distinctly different regions; a straight line high temperature region represented by the left-hand portion of graph O which is a representative graph for this temperature region for all the data of graphs H to N, a straight intermediate temperature region and a curved low temperature region. The curvature in the low temperature region is the reverse of that obtained with fused silicon samples of the prior art. Such curvature extends to temperatures at least as low as −180° C. for graph K, although that graph is not extended so far in Fig. 10. There are two inflection points: one at about 227° C. and another at 400° C. or higher, the exact temperature in the latter case depending on the magnitude of the conductivity of the sample. The conductivities of these films is much lower than that of any other prior art material.

Below 227° C. the curves can be fitted to the equation:

$$\sigma = Ae - \frac{E}{2kT} \qquad (1)$$

where $k$ is Boltzmann's constant, T is the absolute temperature, $\sigma$ is the conductivity per centimeter, E is the energy separation of the filled and unfilled bands, and A is a factor that varies slowly with temperature. The factor A may therefore be written $Af(T)$ as disclosed on page 191 of the book by F. Seitz entitled "The Modern Theory of Solids" published by McGraw-Hill Book Company, incorporated in 1940. In the case of graph K the value of activation energy is approximately zero and slightly negative in value indicating that the impurity level probably lies close to or within one of the bands of the solid.

The values of activation energy for the intermediate region vary, individual values of 0.31, 0.45, 0.41, 0.49 and 0.78 electron volts being obtained from the data on which graphs H to M of Fig. 10 are based.

In the high temperature region individual values of E obtained are 1.13 e. v. (electron volts), 1.106 e. v. and 1.12 e. v. The straight line graph O, as above stated, is the best fit that can be obtained for all the high temperature measurements. It represents a band separation in silicon of 1.12 electron volts. The high temperature data leads to a calculated value of $3.9 \times 10^{-6}$ ohm$^{-1}$ cm.$^{-1}$ for the specific conductivity of pure silicon at 25° C. The lowest specific conductivity observed was $1.8 \times 10^{-5}$ ohm$^{-1}$ cm.$^{-1}$. For this sample the activation energy at room temperature was the highest found, equal to 0.97 electron volt.

The best photoconducting silicon cells are the ones showing the lowest specific conductivity corresponding to very pure silicon. The long wavelength of the photoconductive effect has not been measured accurately, but appears to lie between 12,000 and 15,000 A. U. The thermal activation energy of 1.12 e. v. corresponds to a wavelength $\lambda_0$=11,000 A. U. This is considered strong evidence for the same electron bands being concerned in both the photoelectric and thermal processes of increasing the conductance. The maximum photoelectric sensitivity occurs at 8,400 to 8,600 A. U. which is equivalent to 1.45 electron volts energy. It seems certain that the process is not simply a transition between an impurity level and adjacent bands, since this would result in a much lower value of $\lambda_0$ than was observed.

Observations on the optical transparency of silicon indicated a region of rapidly increasing transparency at 8750 A. U. and extending into the infrared. The high absorption of silicon in the visible and near infrared regions shows a tail extending to about 10,500 A. U. This corresponds to a separation of the conducting and non-conducting bands of silicon equivalent to 1.18 electron volts. Evaporated films also show photoconductance. Maximum photoelectric sensitivity of pyrolytic films is obtained at about the same wavelength as that at which the absorption becomes appreciable.

The photoconductance effect is also present in silicon films in which titanium has been deposited, but due to the higher conductivity of the material a change in conductivity due to light is not as great as in the films of pure silicon.

What is claimed is:

1. A method of producing a photoconductive layer which comprises supporting a body of ceramic material in a reaction chamber, administering a gaseous mixture consisting of substantially pure hydrogen and the vapor of a chloride compound of one of the elements of the group of elements consisting of silicon, boron and germanium to said chamber, and heating said ceramic material to a temperature of approximately 1100° C. to effect the chemical reaction of the chloride compound of said gaseous mixture and the hydrogen and the deposition of a layer of the said element of said compound of low specific conductivity on the exposed surface of said ceramic material, the specific resistance of which layer changes a useful amount upon change of irradiation thereof with light of wavelength within the range of wavelengths of visible and near infrared light.

2. The method of producing a photoconductive layer of purified silicon which comprises supporting a body of ceramic material in a reaction chamber, administering a gaseous mixture consisting of silicon tetrachloride and substantially pure hydrogen to said chamber, and heating said ceramic material to a temperature of approximately 1100° C. for a period of approximately one and one-half minutes to effect the chemical reaction of said silicon tetrachloride and hydrogen and the deposition of a layer of silicon of low specific conductivity on the exposed surface of said ceramic material, the specific resistance of which layer of silicon changes a useful amount upon change of irradiation thereof with light of wavelength within the range of wavelengths of visible and near infrared light.

3. A photoconductive device comprising a plate of glass, a layer of silver vaporized on one surface of said plate, a layer of silicon vaporized on said layer of silver, and a light transmitting layer of gold vaporized on said layer of silicon, said layer of silicon being adapted to have its specific resistance as measured between said layers of silver and gold changed by irradiation with light transmitted through said layer of gold.

4. A photoconductive device comprising a ceramic support, a thin film of material on said support the specific resistance of which changes a useful amount upon a change of irradiation thereof with light of wavelength within the range of wavelengths of visible and near infrared light, said material consisting of an element in substantially pure state from the group of elements consisting of silicon, boron and germanium, and electrical conductors contacting separated portions of said film.

5. A photoconductive device comprising a ceramic support, a thin film of highly pure silicon on said support the specific resistance of which changes a useful amount upon a change of irradiation thereof with light of wavelength within the range of wavelengths of visible and near infrared light, and electrical contacts contacting separated portions of said film.

6. A photoconductive device comprising a ceramic support, a thin film of highly pure boron on said support the specific resistance of which changes a useful amount upon a change of irradiation thereof with light of wavelength within the range of wavelengths of visible and near infrared light, and electrical conductors contacting separated portions of said film.

7. A photoconductive device comprising a ceramic support, a thin film of highly pure germanium on said support the specific resistance of which changes a useful amount upon a change of irradiation thereof with light of wavelength within the range of wavelengths of visible and near infrared light, and electrical conductors contacting separated portions of said film.

8. A photoconductive device comprising a ceramic tube, a thin film of highly pure silicon on said tube the specific resistance of which changes a useful amount upon a change of irradiation thereof with light of wavelength within the range of wavelengths of visible and near infrared light, and separated bands of fired silver paste surrounding and on top of said film near the ends of said tube.

9. A photoconductive device comprising a ceramic support, a film of highly pure silicon on said support having a thickness of approximately 5 microns the specific resistance of which changes a useful amount upon a change of irradiation thereof with light of wavelength within the range of wavelengths of visible and near infrared light, and electrical contacts contacting separated portions of said film.

10. A photoconductive device comprising a ceramic tube, a film of highly pure silicon surrounding the convex surface of said tube formed by supporting said tube in a reaction chamber, administering a gaseous mixture consisting of silicon tetrachloride and substantially pure hydrogen to said chamber and heating said tube to a temperature of approximately 1100° C. for a period of approximately one and one-half minutes to effect the chemical reaction of said silicon tetrachloride and hydrogen and the deposition of a layer of silicon of low specific conductivity on the convex surface of said tube, the specific resistance of which layer of silicon at room temperatures changes a useful amount upon changes of irradiation thereof with light of wavelength within the range of wavelengths of visible and near infrared light, and separated bands of fired silver paste surrounding and on top of said film.

GORDON K. TEAL.

REFERENCES CITED

The following references are of record in the file of this patent:

UNITED STATES PATENTS

| Number | Name | Date |
|---|---|---|
| 718,891 | Acheson | Jan. 20, 1903 |
| 866,462 | Hammer | Sept. 17, 1907 |
| 876,331 | Clark | Jan. 14, 1908 |
| 1,019,391 | Weintraub | Mar. 5, 1912 |
| 1,039,463 | Thomson | Sept. 24, 1912 |
| 1,349,053 | Feild | Aug. 10, 1920 |
| 1,739,256 | Pender | Dec. 10, 1929 |
| 1,964,322 | Hyde | June 26, 1934 |
| 2,281,843 | Jira | May 5, 1942 |
| 2,313,410 | Walther | Mar. 9, 1943 |
| 2,423,476 | Billings | July 8, 1947 |

OTHER REFERENCES

Bidwell, Physical Review, May 1922, pages 447–455.